United States Patent [19]

Hattori

[11] Patent Number: 4,522,613

[45] Date of Patent: Jun. 11, 1985

[54] V-BELT

[75] Inventor: Torao Hattori, Saitama, Japan

[73] Assignee: Honda Giken Kogyo Kabushiki Kaisha, Tokyo, Japan

[21] Appl. No.: 497,653

[22] Filed: May 24, 1983

[30] Foreign Application Priority Data

Jun. 2, 1982 [JP] Japan ............... 57-94579

[51] Int. Cl.³ .............................. F16G 5/18
[52] U.S. Cl. ...................... 474/245; 474/249
[58] Field of Search ........... 474/245, 240, 242, 244, 474/249–252, 237, 238, 246, 247, 43–45, 265

[56] References Cited

U.S. PATENT DOCUMENTS 1,313,171  8/1919  Dukelow .................... 474/249 X

FOREIGN PATENT DOCUMENTS 583310  9/1959  Canada ........................ 474/245
1221861  7/1966  Fed. Rep. of Germany ...... 474/249
300476  11/1928  United Kingdom ............. 474/249
910742  6/1946  United Kingdom ............. 474/245

Primary Examiner—Stephen J. Novosad
Assistant Examiner—Thuy M. Bui
Attorney, Agent, or Firm—Lyon & Lyon

[57] ABSTRACT

A link-type V-belt of relatively inflexible material including a first link having bifurcate ends and a second link having single ends which are pinned together by multiple pins in alternating fashion. Two pins are employed at each intersection between links and are semi-cylindrical for rolling contact between pins and for pivotal movement with the associated link. Broad transmission faces are associated with each link in inclined arrangement for conforming to a V-grooved pulley. Lubricant relief passages aid in the power transmission of the pulley by allowing lubricants to flow from the transmission faces of the belt. At the same time, the belt may be lubricated to further reduce internal frictions and sliding friction on associated pulleys. Informing the link having bifurcate ends, two link members may be positioned together with a spacer therebetween. Pins are calked in place to retain both the pin in position and the link members together. The uncalked pin of the two pins in each link connection is allowed to slide transversely to further reduce friction.

12 Claims, 22 Drawing Figures

PRIOR ART
FIG. 1.
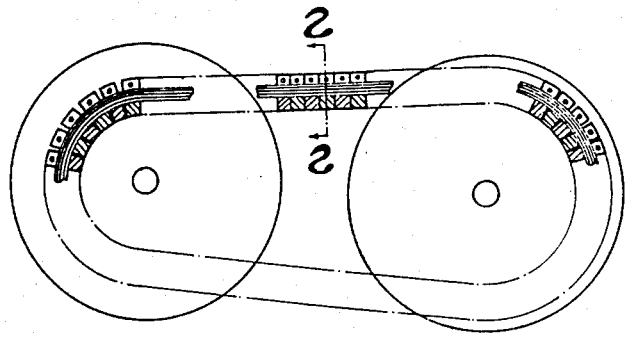
PRIOR ART
FIG. 3.
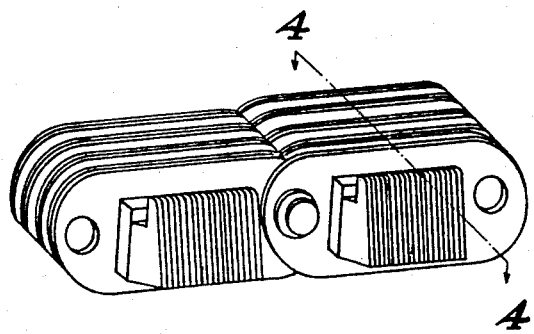
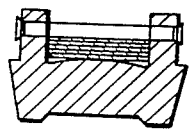
FIG. 2.
PRIOR ART
FIG. 4.
PRIOR ART
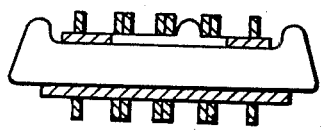

V-BELT

BACKGROUND OF THE INVENTION

The field of the present invention is V-belts and particularly V-belts of relatively inflexible materials.

V-belts have been employed in many circumstances for the transmission of power from one pulley to another. The pulleys employed have grooved peripheral surfaces for receipt of the V-belt such that the tension on the belt acts to wedge the belt into the pulley grooves for increased normal force between the groove and belt surfaces.

Typically, V-belts have been made of reinforced, highly elastic materials such as rubber. Such belts are generally continuous and uniform in cross section and provide high coefficients of friction with the pulley surfaces, relatively high power transmission and substantial longevity. However, such belts also experience large friction losses, losses due to internal hysterisis, and limitations as to power transmitted.

To avoid the failings of more elastic materials, a variety of metal belts have been devised. Such metal belts are generally link-type belts rather than continuous belts as in the case of more flexible materials. A first prior art belt is illustrated in FIGS. 1 and 2. Such a belt includes metal V-blocks which are assembled on a plurality of endless belts or metal strips. The metal strips are overlaid and set within channels formed in the metal V-blocks. Pins extend across the channels over the metal strips to retain the metal V-blocks in place.

The device illustrated in FIGS. 1 and 2 is generally subject to elongation under any significant amount of power; and torque transmission may be lost due to the play between adjacent V-blocks. Alternatively, the metal strips may be thickened to overcome the foregoing problems. However, the belt is then less flexible and will not conform to the radius of the pulley. Non-conformance of the belt to the pulley can result in variations in the drive ratio and other difficulties associated with lack of flexibility.

In another example of prior art metal V-belts, FIGS. 3 and 4 illustrate a link-type V-belt having pins connecting adjacent links. Extending through the links to opposite sides thereof are rigid plates having small, inclined end surfaces. These plates are stacked to give effective width to the inclined surfaces. The plates may be set within a bearing type material or resilient type material to enable the plates to better conform to the conical surfaces of the groove of the pulley. The resulting inclined surfaces thus formed are, by the structure of the device, generally relatively small in relation to the size of the links. As a result, low torque transmission capability is exhibited. Furthermore, as the plates are capable of moving relative to the links, internal friction is experienced resulting in low transmission efficiency.

SUMMARY OF THE INVENTION

The present invention is directed to the construction of V-belts of relatively inflexible material. Large inclined transmission surfaces are capable of being employed on the links. Connection between the links may also be undertaken to provide rolling contact between connecting surfaces supporting the tension load on the belts. The belts may further operate in a lubricant wetted condition to further reduce friction and yet maintain high power transmission. Because of the foregoing features, the V-belt of the present invention is capable of withstanding large power transmission loads, exhibits low friction losses and has relatively no losses due to hysterisis effect. Increased belt longevity is also effected.

In accomplishing the foregoing, a first aspect of the present invention is to employ a link structure which admits of large transmission surfaces both per link and for the belt. In another aspect, friction losses between the belts and the drive and driven pulleys may be reduced by using a lubricant wetted belt. To gain additional purchase in transmitting power to or from the pulleys, the belt may employ lubricant relief passages for a high static coefficient of friction when the belt link is firmly engaged with a pulley. Dual pins may be employed in a further aspect of the present invention at each link juncture such that rolling contact is experienced between pin surfaces as the links are flexed. To promote further efficiency in such flexure, one of the pins is allowed to float or play transversely as a further means for reducing friction loss.

Accordingly, it is a principal object of the present invention to provide an improved V-belt employing relatively inflexible materials with low friction losses and high transmission capabilities. Other and further objects and advantages will appear hereinafter.

BRIEF DESCRIPTION OF THE DRAWINGS

FIG. 1 is a side view of the prior art device.

FIG. 2 is a cross section taken alone line 2—2 of FIG. 1.

FIG. 3 is an oblique view of a prior art device.

FIG. 4 is a cross section taken alone line 4—4 of FIG. 3.

DETAILED DESCRIPTION OF THE PREFERRED EMBODIMENTS

Figure 5:
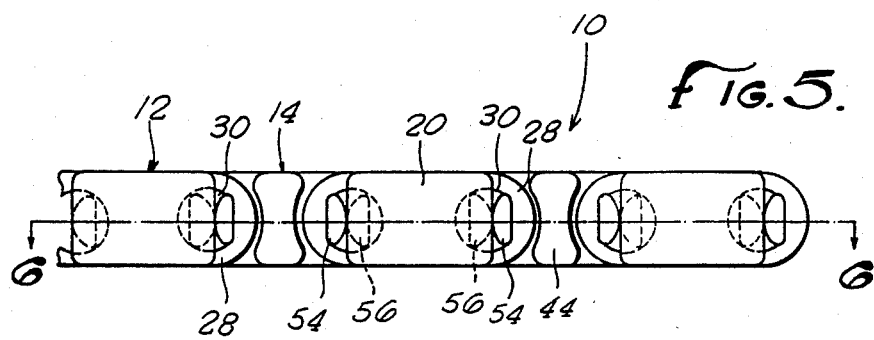
FIG. 5 is a side view of a first embodiment of the present invention.
Figure 6:
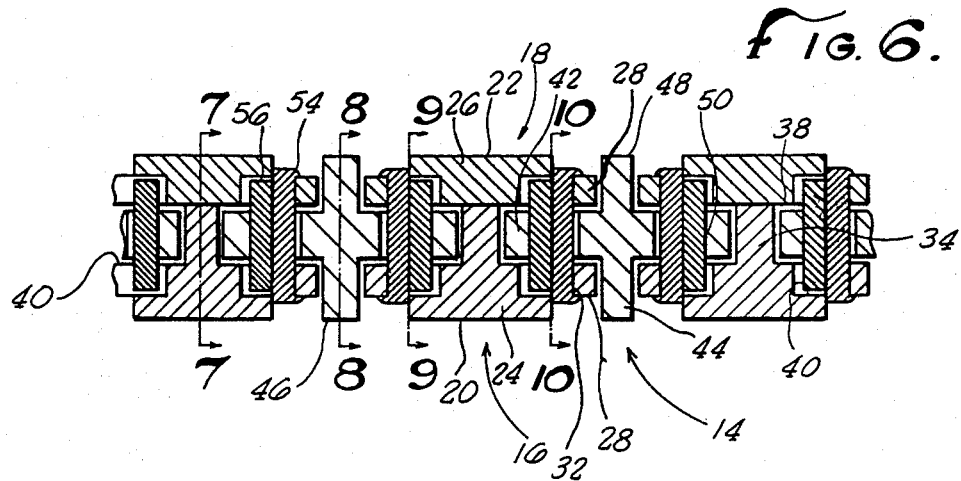
FIG. 6 is a cross-sectional plan view taken along line 6—6 of FIG. 5.
Figure 7:
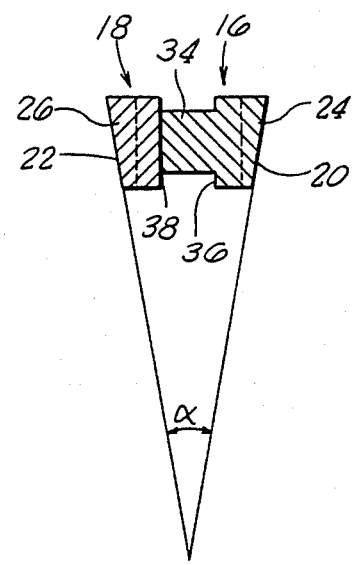
FIG. 7 is a cross-sectional end view taken along line 7—7 of FIG. 6.
Figure 8:
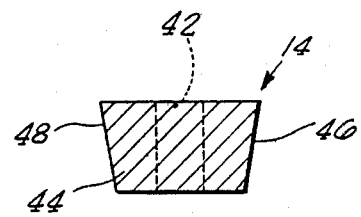
FIG. 8 is a cross-sectional end view taken along line 8—8 of FIG. 6.
Figure 11:
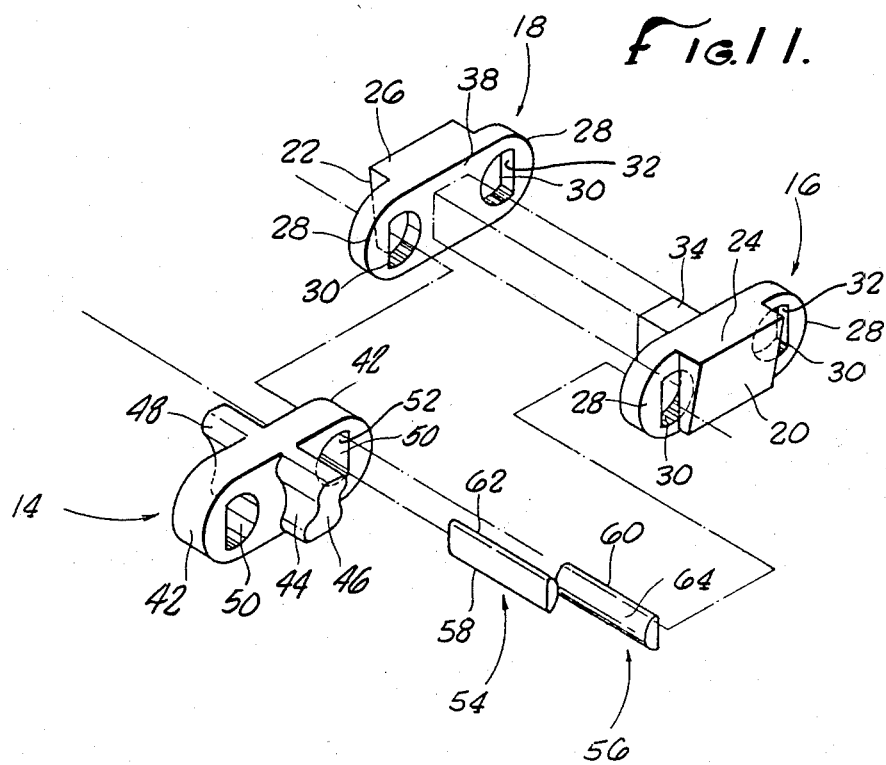
FIG. 11 is an oblique exploded view of the embodiment of FIG. 5.

Turning in detail to the drawings, and particularly FIGS. 5 through 13, a metal V-belt assembly, generally designated 10 is disclosed which is intended to be employed with drive and driven pulleys. The use contemplated by the present mechanism is for continuous gear reduction mechanisms for motorcycles. The belt 10 is constructed of individual links 12 and 14 which are alternately connected to form the continuous belt. The link 14 is constructed as a single piece in this first embodiment while the link 12 is divided into a right link member 16 and a left link member 18. The links 12 and 14 are held in place by pins described below with certain of the pins being calked to hold the link members 16 and 18 together.

The links 12 including right link member 16 and left link member 18 includes rigidly fixed, inclined transmission faces 20 and 22 which are located on opposite sides of the link 12. The faces are arranged such that they will appropriately contact and be wedged against the sides of the grooves about the associated pulleys. These transmission faces 20 and 22 are defined by inclined blocks 24 and 26. The inclined blocks 24 and 26 extend outwardly from the main portion of each link member 16 and 18 across a maximum available surface area for maximum contact with a pulley. The extent of the transmission faces 20 and 22 can be seen by reference to FIG. 5. The link members 16 and 18 also extend to two ends 28. The ends 28 are located at either end of each of the link members, and therefore four such ends 28 are associated with each link 12. In this way, one end 28 from the right link member 16 and one end 28 from the left link member 18 define a bifurcate end for linking with the adjacent link 14. Connecting holes 30 extend through each of the ends 28 and are mutually aligned at each end of the link 12. These connecting holes 30 include a flat wall segment 32 which is most adjacent the end of each of the link members. The right link member 16 also includes a transverse spacer 34 extending from the inner surface 36 of the right link member 16. This spacer 34 abutts against the inner surface 38 of the left link member 18. The link members 16 and 18 also include a flange 40 extending partially over each of the holes 30. The flange 40 is continous with the inclined blocks 24 and 26 to extend the transmission surfaces 20 and 22 as far as possible.

The link 14 includes two ends 42 which are placed centrally at either end of this link. Between the ends and extending transversely is a block 44. The block 44 is rigidly fixed to the link 14 and extends to inclined transmission faces 46 and 48. The inclined transmission faces 46 and 48 are most conveniently equal in the angle of inclination to the transmission faces 20 and 22 and are also equally spaced. This may best be understood by a quick review of FIGS. 7 and 8. The truncated V-surfaces thus defined cooperate equally with the associated pulley mechanisms. Extending through the ends 42 of the link 14 are connecting holes 50. The connecting holes 50 may be brought into alignment with the connecting holes 30 to receive pins for joining the links together in alternating arrangement. However, the connecting holes 50 also include a flat wall segment 52. The flat wall segments 52 are not aligned with the flat wall segments 32 of the links 12 but face in opposite directions, the flat wall segments 52 being most adjacent the ends of the link 14.

To avoid binding and to insure proper operation and minimum frictional losses, the cooperation between the links 12 and links 14 is such that reasonable spacing is available. To this ends, the transverse spacer 34 acts to divide the inner surfaces 36 and 38 such that the space therebetween at either end of the link 12 is somewhat wider than the width of the ends 42 of the link 14. Additionally, the ends of both links 12 and 14 and the locations of the connecting holes 30 and 50 are arranged such that the ends of each link do not bind against surfaces on the adjacent link.

Connecting the links 12 and 14 are pins extending through the connecting holes 30 and 50. The pins may be divided into two groups, pin 54 being longer than pin 56. Both pins 54 and 56 each include a flat side 58 and 60, respectively. The flat side 58 of pin 54 is juxtaposed with the flat wall segment 32; while the flat wall segment 52 and the flat side 60 of pin 56 are juxtaposed. By mating flat wall segments together as described and shown, the pins 54 and 56 are caused to pivot with the adjacent link. That is to say, pin 54 pivots with link 12 while pin 56 pivots with link 14 as the V-belt conforms to an associated pulley. The remaining surface of each pin 54 and 56 is circular in cross section thus roughly defining semicylindrical pins. The cylindrical surface 62 of pin 54 and the cylindrical surface 64 of pin 56 are abutting one another in each of the intersections between the links 12 and 14. Because the pins 54 and 56 are otherwise constrained to pivot with one or the other of the links 12 and 14, the pins 54 and 56 cooperate in rolling contact with one another during flexing of the belt.

The pins 54 are designed to be longer than the width of the link as measured at both connecting holes 30. As these pins 54 extend laterally of the link 12 at the connecting hole location, the ends 66 may be calked against the surfaces of the link 12. By calking both pins 54 associated with the ends 28 of the link 12, the link members 16 and 18 are held together and the pins 54 held in place.

Figure 12:
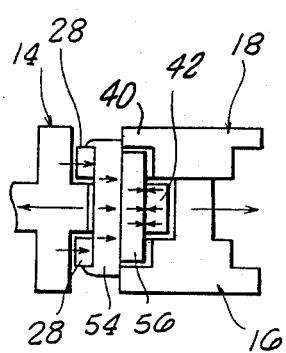
FIG. 12 is a forced diagram illustrating the loads on the belt links.
Figure 13:
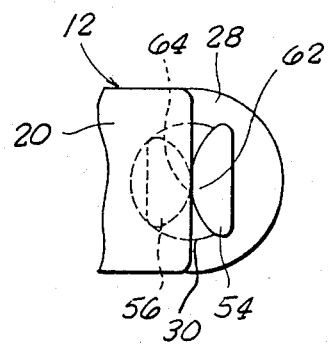
FIG. 13 is a detailed side view illustrating the location of the pins of the embodiment of FIG. 5.
Figure 9:
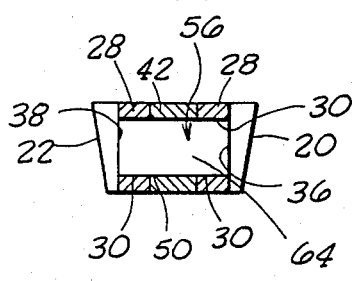
FIG. 9 is a cross-sectional end view taken along line 9—9 of FIG. 6.
Figure 10:
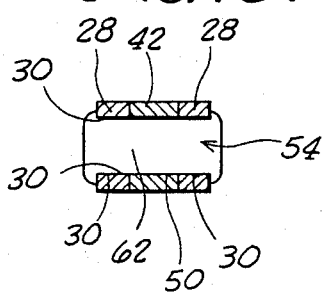
FIG. 10 is a cross-sectional end view taken alone line 10—10 of FIG. 6.

The pins 56 are shorter than the pins 54 and are designed to fit within the connecting holes 30 and 50 such that they do not extend completely to the flanges 40. In this way, the pins 56 are able to slide transversely in the connecting hole formed by the links. At the same time, the pin 56 pivots with the link 14 even though it is capable of sliding transversely. This transverse play aids in the reduction of friction, thereby increasing transmission efficiency. The forces applied in resisting the tension of the belt through the pins and links is illustrated in FIG. 12. The tension loads on the link 12 and the link 14 are transmitting through the ends 28 and 42 as resisted by the pins 54 and 56.

The forces as applied through the transmission faces 20 and 22 and 46 and 48 include a coefficient of friction between the pulley and the V-belt measured as the apparent coefficient of friction which may be expressed in the following equation:

$$\mu' = \frac{\mu}{\sin\frac{\alpha}{2} + \cos\frac{\alpha}{2}} = \operatorname{cosec}\frac{\alpha}{2}$$

where
$\mu'$ = apparent coefficient of friction;
$\mu$ = coefficient of friction between materials;
$\alpha$ = angle of V.

Thus, if the V angle is set at about 20° to 40°, the apparent coefficient of friction may reach from 2 to 3 times the coefficient of friction normally between the materials. As a result, a high torque transmission can be insured even if the V-belt and the pulleys are dipped in lubricant such that the result is that the coefficient of friction is reduced.

Figure 14:
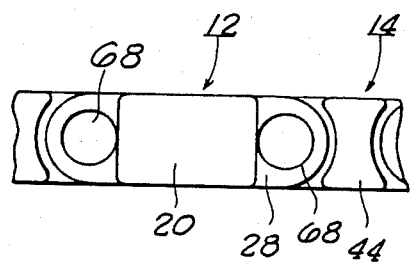
FIG. 14 is a second embodiment of the present invention illustrated in side elevation.
Figure 16:
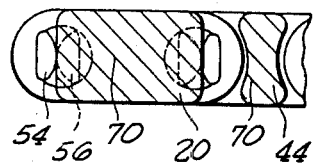
FIGS. 16, 17, 18, 19 and 20 illustrate various surface features providing lubricant relief passages on the embodiment of FIG. 5 illustrated in side elevation.
Figure 17:
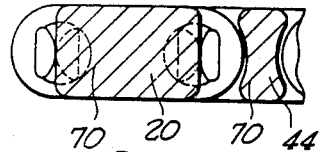
Figure 18:
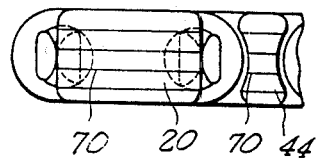
Figure 15:
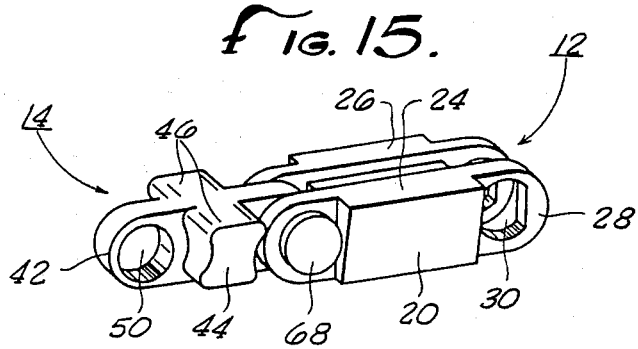
FIG. 15 is an oblique view of the embodiment of FIG. 14.
Figure 19:
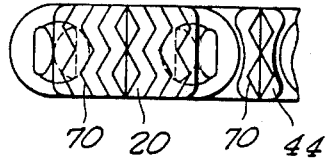
Figure 20:
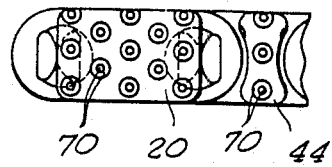
Figure 21:
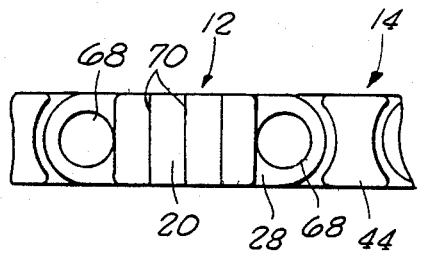
FIG. 21 illustrates lubricant relief passages on the side elevation of the embodiment of FIG. 14.
Figure 22:
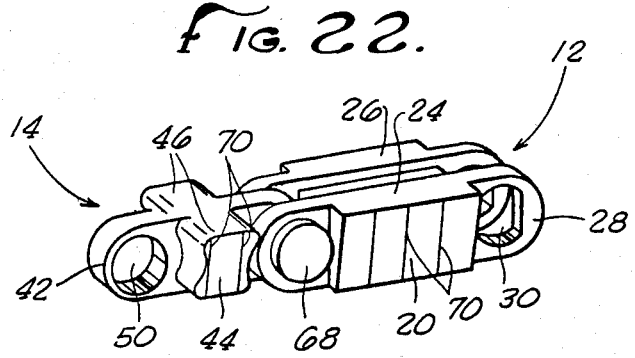
FIG. 22 illustrates an oblique view of the device of FIG. 21.

In the embodiment described in FIGS. 5 through 13, two pins 54 and 56 are employed to join the links 12 and 14 together. In FIGS. 14 and 15, the connecting holes 30 and 50 may be reduced in size and fitted with a single cylindrical pin 68. Both ends of the cylindrical pin 68 can then be calked to retain both the pin in place and the links together. Additionally, where appropriate, the link members 16 and 18 may be formed as one element similarly shaped but with the transverse spacer 34 integral with both link members 16 and 18. In this way, construction can be simplified where allowable.

The embodiments discussed have been contemplated for manufacture with relatively inflexible material. Thus, the links 12 and 14 may be made of such materials as metal or rigid polymers such as synthetic resin, for example, polyacetal. In the case of resins, lubricant may not be appropriate. However, in the case of metals, it is advantageous to wet the V-belt with lubricant. This use of lubricant insures against friction loss which can, in the case of metal materials, result in seizures and damaging temperatures.

Looking then to the embodiments of FIGS. 16 through 22, lubricant relief passages 70 are formed on the transmission faces 20 and 22 and 46 and 48. These lubricant relief passages 70 may be uniformly placed on the surfaces, maybe randomly placed or maybe placed at a regularly varying pattern, the latter two being less likely to create specific wear points on the pulleys rather than overall wear. The lubricant relief passages 70 allow lubricant to be ejected from the faces 20 and 22 as the belt segment or link comes into static contact with an associated pulley. In this way, friction losses are further reduced while static friction of the belt on the associated pulley or pulleys is increased.

Thus, a V-belt of inflexible lengths is disclosed in multiple embodiments which has a low friction losses and is capable of transmitting substantial power. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A V-belt comprising
   first links each including a right link member, a left link member, a transverse spacer therebetween and rigidly fixed, inclined transmission faces on two opposite sides thereof, each said link member having two first ends with a first connecting hole through each said first end;
   second links each including two second ends with a second connecting hole through each said second end and a block between said two second ends having rigidly fixed, inclined transmission faces on two opposite sides thereof, said inclined transmission faces of said first and second links having equal transverse spacing and equal angles of inclination; and
   pins extending through said first and second connecting holes and alternately connecting said first and second links.

2. The V-belt of claim 1 wherein said transverse spacer is rigidly fixed to one of said right and left link members and abuts the other of said right and left link members.

3. The V-belt of claim 1 wherein two said pins extend through each said first and second connecting holes.

4. A V-belt comprising
   first links each including two first ends and transmission faces on opposite sides thereof each said first end being bifurcate with a first connecting hole therethrough;
   second links each including two second ends positionable within said first bifurcate ends and including a second connecting hole through each said second end; and
   pins alternately connecting said first and second links and extending through said first and second connecting holes, said links including at each said connection between said first and second links a first pin held to pivot with said first link and a second pin held to pivot with said second link, said pins being in mutual rolling contact, and wherein each of said first and second connecting holes includes a flat wall segment and each said pin includes a flat side in juxtaposition with a said flat wall segment to hold each said pin and said juxtaposed wall segment from relative pivotal motion.

5. The V-belt of claim 4 wherein siad flat wall segments of said first connecting holes are most adjacent the ends of said first links and of said second connecting holes are most adjacent the ends of said second links.

6. The V-belt of claim 5 wherein each said pin is roughly semicylindrical.

7. A V-belt comprising
   first links each including two first ends and transmission faces on opposite sides thereof, each said first end being bifurcate with a first connecting hole therethrough;
   second links each including two second ends positionable within said first bifurcate ends and including a second connecting hole through each said second end; and
   pins alternately connecting said first and second links and extending through said first and second connecting holes, said links including at each said connection between said first and second links a first pin held to pivot with said first link and a second pin held to pivot with said second link, said pins being in mutual rolling contact with one of said first and second pins being fixed to one of said first and second links and the other of said first and second pins being slidable transversely of the other of said first and second links in said connecting holes.

8. The V-belt of claim 7 wherein said inclined transmission faces of said first and second links have equal transverse spacing and equal angles of inclination.

9. The V-belt of claim 7 wherein said first links further include flanges extending partially across said first connecting holes to retain said second pins within said first connecting holes.

10. The V-belt of claim 7 wherein said transmission faces include lubricant relief passages thereon.

11. A V-belt comprising
   first links each including two first ends and transmission faces on opposite sides thereof each said first end being bifurcate with a first connecting hole therethrough;
   second links each including two second ends positionable within said first bifurcate ends and including a second connecting hole through each said second end; and pins alternately connecting said first and second links and extending through said first and second connecting holes, said links including at each said connection between said first and second links a first pin held to pivot with said first link and a second pin held to pivot with said second link, said pins being in mutual rolling contact, said first pins being calked to said first links and said second pins being slidable transversely of said second links in said connecting holes.

12. A V-belt comprising first links each including two first ends and transmission faces on opposite sides thereof each said first end being bifurcate with a first connecting hole therethrough;

second links each including two second ends positionable within said first bifurcate ends and including a second connecting hole through each said second end; and pins alternately connecting said first and second links and extending through said first and second connecting holes, said links including at each said connection between said first and second links a first pin held to pivot with said first link and a second pin held to pivot with said second link, said pins being in mutual rolling contact, and each said first link includes a right link member, a left link member, and a transverse spacer therebetween, said spacer being rigidly fixed to one of said right and left link members and being in abutting contact with the other of said right and left link members, said first pins being calked to said first links, retaining each said right and left link members together.

* * * * *